United States Patent [19]

Sapp

[11] Patent Number: 4,526,134

[45] Date of Patent: Jul. 2, 1985

[54] AUTOMATIC FISH FEEDING APPARATUS

[76] Inventor: Charles Sapp, 2149 Rio Guacimal Ct., San Jose, Calif. 95116

[21] Appl. No.: 583,605

[22] Filed: Feb. 27, 1984

[51] Int. Cl.³ .............................................. A01K 5/02
[52] U.S. Cl. .............................. 119/51.13; 119/56 R; 222/166
[58] Field of Search ............... 119/51 R, 51.11, 51.13, 119/56 R; 222/164, 166

[56] References Cited

U.S. PATENT DOCUMENTS

| | | | |
|---|---|---|---|
| 2,275,887 | 3/1942 | Chandler | 119/56 R |
| 3,134,360 | 5/1964 | Lewis | 119/51 R |
| 3,726,438 | 4/1973 | O'Rourke | 119/51.13 X |
| 3,754,527 | 8/1973 | Jenkins | 119/51.11 X |
| 4,185,588 | 1/1980 | Harris | 119/51.12 |

Primary Examiner—Robert P. Swiatek
Attorney, Agent, or Firm—Paul H. Hickman

[57] ABSTRACT

An automatic fish feeding device characterized by a ferris wheel type assembly rotated incrementally by a clock mechanism. The ferris wheel type assembly carries a plurality of buckets, each of which is provided with a predetermined amount of fish food. The clock mechanism rotates the ferris wheel type assembly a predetermined amount so that a trip member will engage a food bucket to spill its contents into the aquarium below.

14 Claims, 5 Drawing Figures

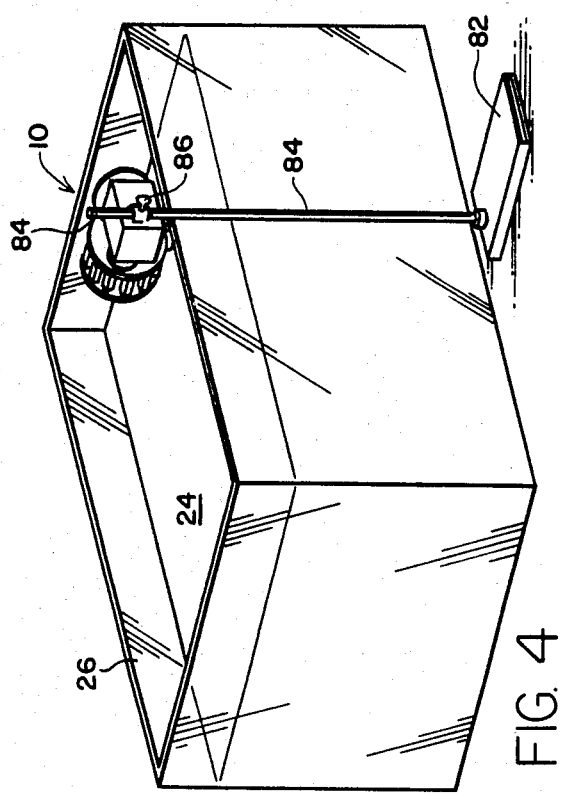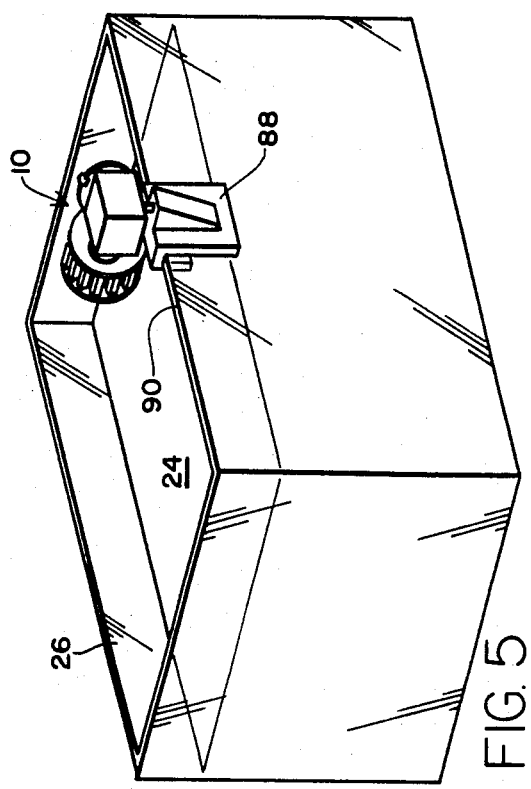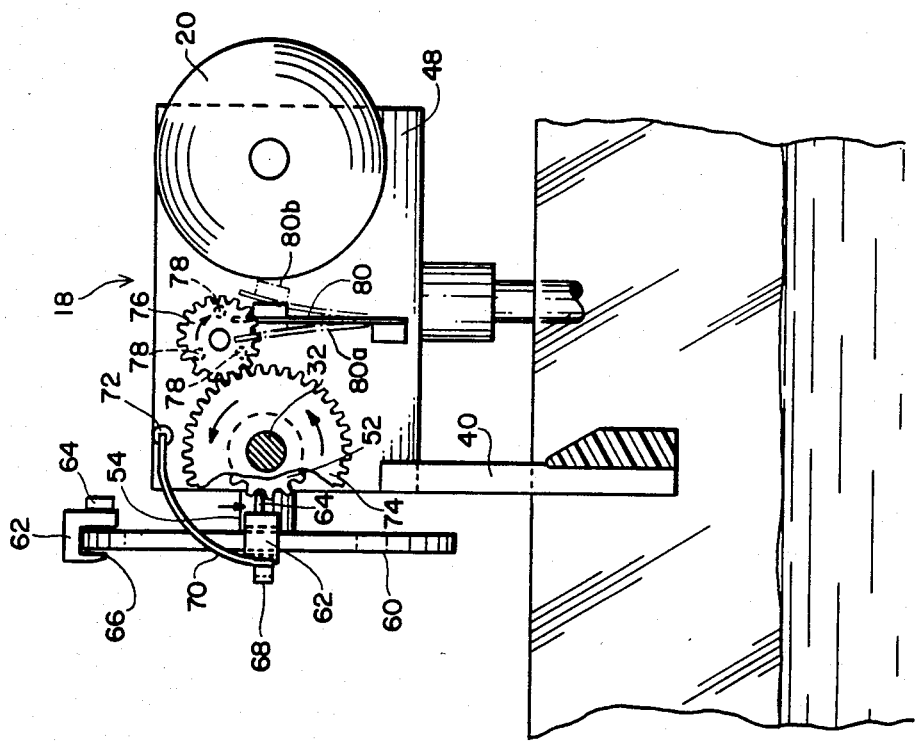

4,526,134

AUTOMATIC FISH FEEDING APPARATUS

BACKGROUND OF THE INVENTION

1. Field of the Invention

This invention relates generally to feeding devices for animals and more particularly to automatic fish feeding devices.

2. Description of the Prior Art

Many people keep an aquarium in their home or office. One reason for keeping fish is that a properly maintained fish tank is a beautiful and interesting addition to a room's decor. On the other hand, many people will keep an aquarium as an interesting and rewarding hobby.

Fish have to be fed regularly and in proper amounts. To little food, to much food, or food provided at the wrong time can result in dead fish and and a dirty aquarium. It is therefore important to develop a proper feeding schedule for the fish, and to strictly adhere to that schedule.

It is, of course, very difficult for people to always be available to feed their fish. For example vacations, emergencies, and other events may require the aquarium owner to be elsewhere at feeding time. Furthermore, even if the owner is available the task of feeding his or her fish may be unwanted or inconvenient.

The above mentioned problems have been addressed in the prior art by U.S. Pat. No. 2,847,066 of Kleiber, and U.S. Pat. No. 2,858,799 of Krauss. In Kleiber, an automatic feeding device includes an electric clock mechanism which dispenses a predetermined amount of fish food once during each 24 hour period. The time at which the fish food is dispensed can be set on the clock face of his device.

In the Krauss patent an automatic fish feeder is disclosed including a vertical storage tower provided with a plurality of shelves, each of which contains enough fish food for one day. An electric clock mechanism causes the shelves within the tower submerge into the fish tank at the rate of one shelf per day.

A problem with automatic fish feeders of the prior art is that time intervals between feedings are essentially nonadjustable. For example, if the optimal feeding schedule calls for a heavy feeding in the morning and a lighter feeding in the afternoon and evening, the fish feeders of Kleiber and Krauss could not be utilized. Furthermore, the amount of fish food which is released by the prior art devices is usually fixed by the mechanism itself.

Another problem associated with prior art automatic fish feeders is that the fish within the tank do not always immediately realize that their food has been released. This can allow a major portion of the fish food to settle to the bottom of the tank resulting in waste and in the eventual fouling of the tank. The Kleiber patent addresses this problem by having his automatic fish feeding device turn on the aquarium light before and during the feeding operation to alert the fish therein.

There are several problems with using a light to signal the fish that it is feeding time. Firstly, fish lights consume a considerable amount of energy, which usually means that the fish feeding device must be coupled to AC power source. Secondly, a signaling light is not always effective during daylight hours, particularly if sunlight is shining directly upon the aquarium.

SUMMARY OF THE INVENTION

It is an object of this invention to provide an inexpensive and uncomplicated automatic fish feeding apparatus which can be powered entirely by internal energy sources.

Another object of this invention is to provide an automatic fish feeding device which can be programmed to feed the fish at several times during the day.

Yet another object of this invention is to provide an automatic fish feeder which provides an auditory or vibratory signal to the fish that they are about to be or have just been provided with food.

A still further object of this invention is to provide an automatic fish feeding device which can dispense different amounts of fish food at different times during the day.

Briefly, an invention in accordance with the above objectives includes a feed wheel rotatable around a substantially horizontal axis, a plurality of feed buckets pivotally attached to the feed wheel, a trip member located in the path that the buckets make as the feed wheel is rotated, and a clock assembly coupled to the feed wheel and operative to incrementally move the buckets past the trip member. A bell mechanism can also be coupled to the clock assembly so that it will ring shortly before, shortly after, or during the feeding process. The clock assembly is preferably powered by a small, electric motor, or by a mechanical wind-up mechanism. The clock assembly preferably includes a clock face provided with one or more clocking tabs, and a wheel gear attached to the feed wheel and operative to rotate the feed wheel through a predetermined radial angle under the control of the clocking tab.

An advantage of this invention is that, due to its modest power requirements, it can be powered by an internal power source.

Another advantage of this invention is that by providing a number of clocking tabs, the fish feeding apparatus can be programmed to dispense fish food several or many times within a particular 24 hour period.

Yet another advantage of this invention is that it provides a more effective signaling method to alert the fish that they have been fed.

A still further advantage of this invention is that each of the feeding buckets can be provided with varying amounts of fish food so that the amount of food dispensed can be adjusted to fit a particular feeding schedule.

These and other objects and advantages of the present invention will no doubt become apparent upon a reading of the following descriptions and a study of the several figures of the drawing.

BRIEF DESCRIPTION OF THE DRAWING

FIG. 3 is a cross section taken along line 3—3 of FIG. 1.

FIG. 4 is a perspective view illustrating a support stand for the automatic fish feeding apparatus.

FIG. 5 is a perspective view illustrating an alternate embodiment for a support stand.

DETAILED DESCRIPTION OF THE PREFERRED EMBODIMENT

Figure 1:
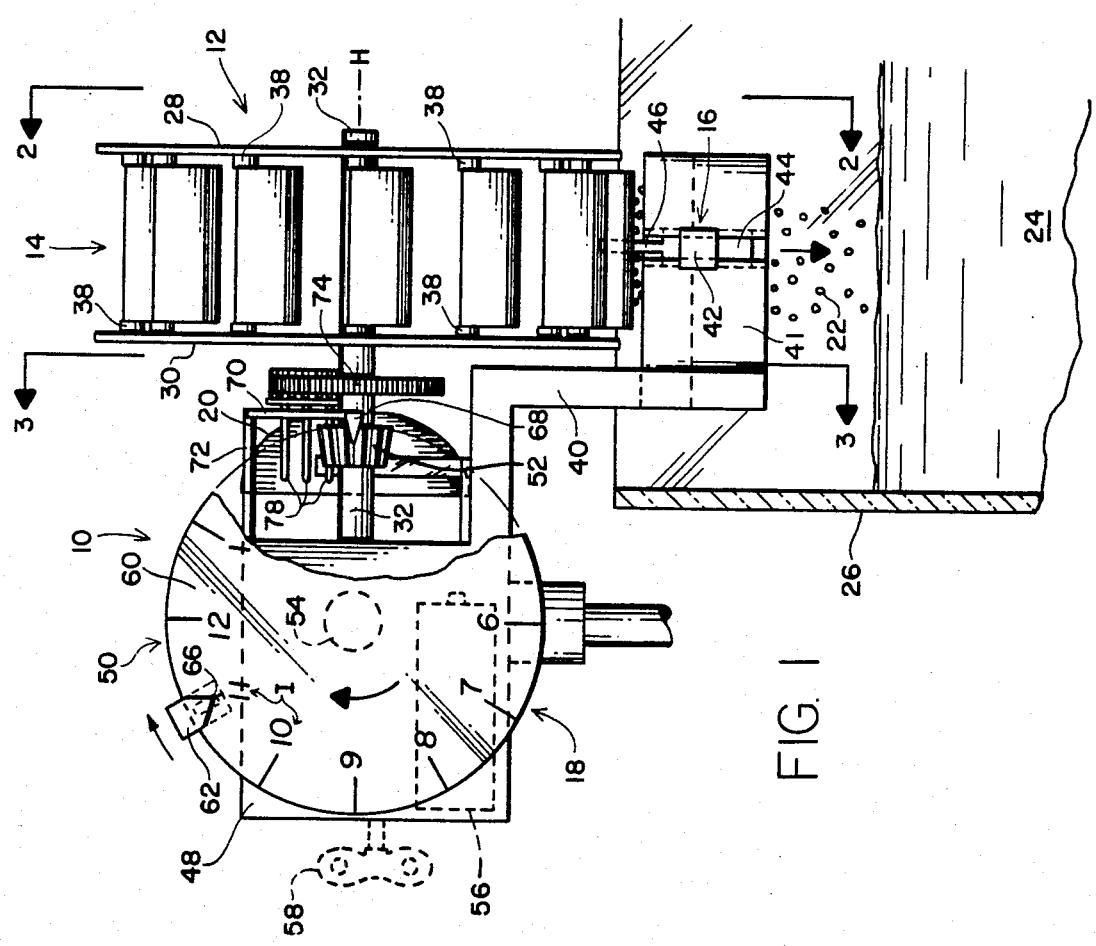
FIG. 1 is a front elevational view of an automatic fish feeding apparatus in accordance with the present invention.

Referring to FIG. 1, an automatic fish feeding mechanism 10 in accordance with the present invention includes a wheel assembly 12 having a number of buckets 14, a trip member 16, a clock assembly 18, and a bell member 20. The fish feeding mechanism 10 is designed to dispense fish food 22 into the water 24 of an aquarium 26.

Figure 2:
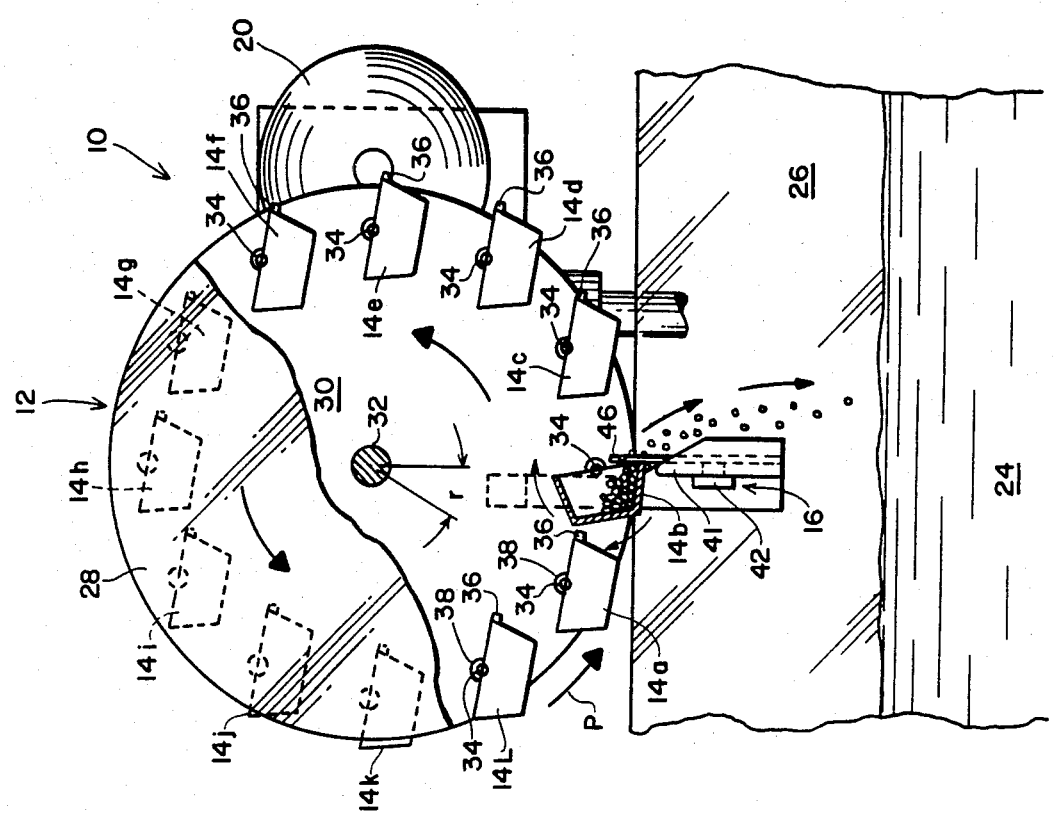
FIG. 2 is a side elevational view of the apparatus taken along line 2—2 of FIG. 1.

With additional reference to FIG. 2, wheel assembly 12 includes a first wheel disk 28 and a second wheel disk 30. First wheel disk 28 and second wheel disk 30 are supported by a common axle 32 which allows the wheel assembly 12 to rotate around a substantially horizontal axis H. The buckets 14, which in FIG. 2 are labeled 14a–14l, are pivotally supported between first wheel disk 28 and second wheel disk 30 by pivot pins 34. Thus, as can be seen in the figures, the buckets 14 tend to remain in a substantially upright or vertical position no matter what their location is around the circumference of wheel assembly 12.

The buckets 14 are shown to be substantially trapezoidal in shape and are provided with a lip 36 on their leading edge. The pivot pins 34 are engaged with apertures provided in upper portions of buckets 14 and are supported within apertures provided in bosses 38 which extend inwardly from the surfaces of first wheel disk 28 and second wheel disk 30. Trip member 16 is supported by a Z shaped support frame 40. Trip member 16 has a slide member 42 engaged with a slot 44 provided in a lower portion 41 of support frame 40. Trip member 16 also includes a finger 46 attached to the slide portion 42 which can extend into the path P (see FIG. 2) of buckets 14. By sliding slide portion 42 within slot 44, the amount of extension of finger 46 into path P of buckets 14 can be varied.

Referring now primarily to FIGS. 1 and 3, clock assembly 18 is also supported by frame member 40 and includes a motor mechanism 48, an adjustable clocking gear 50, and a bevel or spur type wheel gear 52 attached to axle 32. The clock assembly 18 is designed to rotate wheel assembly 12 through a predetermined radial angle r (see FIG. 2).

Motor mechanism 48 is of the continuous operation type and has a rotary output shaft 54. The motor mechanism can be of several types including a small electric motor powered by a dry-cell battery 56, or a mechanical wind-up motor energized by a key 58. In either case, the torque required of output shaft 54 is slight, resulting in a minimal power drain of the motor mechanism 48.

Clocking gear 50 includes a clock face 60, and at least one clocking tab 62 attached to a circumferential surface of clock face 60. As seen in FIGS. 1 and 3, clock face 60 is substantially disk shaped and is attached to the output shaft 54 of motor mechanism 48. Printed or otherwise provided on the front surface of clock face 60 are indicia I which represent the hours of the day. The clock face 60 shown rotates once every 12 hours, although alternate embodiments of this invention have clock faces which rotate once every 24 hours, once every 48 hours, etc.

Still referring to FIGS. 1 and 3, clocking tabs 62 (one of which can be seen in FIG. 1 and two of which can be seen in FIG. 3) include a protrusion 64 which engages the teeth of wheel gear 52 as it rotates by. Protrusion 64 and wheel gear 52 are designed such that wheel 14 will rotate through the radial angle r (see FIG. 2) each time a clocking tab 62 engages and passes by the wheel gear 52.

Clocking tabs can be attached to clock face 60 by a strong friction clip, or can be provided with suitable set screws, detents, etc. The point 66 of each clocking tab 62 is set over the desired hour of the day that the fish are to be fed.

A pointer 68 is supported by an arcuate member 70 attached to a support post 72. The support post 72 is conveniently attached to the housing of motor mechanism 48, but could also be attached to the support frame. It should be noted that the pointer 66 is aligned with the center of wheel gear 52 and thus is calibrated to show the real time of the day. For example, when the clocking tab 66 shown at 11:00 in FIG. 1 is aligned with pointer 68, the time will be exactly 11:00 and one of buckets 14 will be tipped over by the trip member. Also attached to shaft 32, and thus rotated by the clock assembly 18, is a spur gear 74. Spur gear 74 is, in turn, engaged with a second spur gear 76 having a plurality of pins 78 extending from its inner surface. As the shaft 32 rotates through the radial angle r one of the pins 78 will engage a resilient bell clapper 80 to move it back to a position 80a and then release it. The release of bell clapper 80 from position 80a will cause it to spring forward to a new position 80b striking the bell member 20. Thus, each time fish food 22 is released by this device, an accompanying bell tone will sound, sending its vibrations throughout aquarium 26.

Referring now to FIG. 4, the fish feeding mechanism 10 can be supported by a base 82 and support post 84. The base 82 engages the surface s upon which aquarium 86 rests, and the lower end of support post 84 is attached to the upper surface of base 82. Support post 84 is preferably adjustably attached to fish feeding mechanism 10 by an adjustment member 86 so that the height of the fish feeding mechanism can be varied to accommodate different heights of aquariums.

In FIG. 5, a clip type support 88 engages an edge 90 of aquarium 26 and supports the fish feeding mechanism 10 over the water 24. The clip type support 88 is advantageous in that it will attach to virtually any size or shape of aquarium, and does not require a support surface upon which it must stand. In operation, clock face 60 is first rotated by hand until the correct hour of the day is aligned with pointer 68. Clocking tabs 62 are then placed around the circumferential surface of clock face 60 to indicate the desired time during the day that the fish are to be fed. The motor mechanism is then activated.

Next, the user places an appropriate amount of fish food within each of buckets 14. Since all of the buckets are easily accessible, varying amounts of fish food can easily be placed within the buckets. For example, clocking tabs 62 can be set for 11:00 and 3:00, and the bucket corresponding to the 11:00 feeding can be provided with more fish food than the bucket associated with the 3:00 feeding. Of course, by providing more clocking tabs the fish can be fed even at more times in the day.

As the clock face 60 rotates, clocking tabs 62 engage wheel gear 52 and to cause shaft 32 to rotate through the radial angle r. As seen in FIG. 2, this causes a bucket 14b to engage the finger 46 of trip member 16 resulting in the upset of bucket 14b and the spilling of its contents. Simultaneously, gears 74 and 78 cause the clapper 80 to ring bell 20 to alert the fish that food has just been dispensed into the water 24.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. An automatic fish feeding apparatus comprising:
   a wheel means having a substantially horizontal axis of rotation;
   a plurality of feed buckets pivotally attached to and evenly spaced around a circumferential portion of said wheel means, where adjacent pairs of said feed buckets are separated by a fixed, predetermined radial angle;
   a trip member located in the path of said feed buckets; and
   clock means coupled to said wheel means and operative to rotate said wheel means by said predetermined radial angle, whereby one of said feed buckets engages and is tipped over by said trip member, said clock means including a continuous operation motor having a rotary output shaft, and gear means coupling said output shaft to said wheel means, said gear means including a clocking gear coupled to said motor means, and a wheel gear attached to said wheel means.

2. An automatic fish feeding apparatus as recited in claim 1 wherein said wheel means includes a separated pair of wheel members supported by a substantially horizontally oriented axle.

3. An automatic fish feeding apparatus as recited in claim 2 wherein each of said feed buckets is pivotally supported by a pivot pin which extends between said pair of wheel members.

4. An automatic fish feeding apparatus as recited in claim 1 wherein said feed buckets are attached to said wheel means such that they maintain an upright position as said wheel means rotates, except when they are tipped over by said trip member 5. An automatic fish feeding apparatus as recited in claim 1 wherein each of said feed buckets is of sufficient volume to contain enough fish food for one feeding period.

6. An automatic fish feeding apparatus as recited in claim 1 wherein said trip member is adjustable such that the extension of said trip member into said path of said feed buckets can be varied.

7. An automatic fish feeding apparatus as recited in claim 1 wherein said motor is electrically powered.

8. An automatic fish feeding apparatus as recited in claim 1 wherein said motor is mechanically powered.

9. An automatic fish feeding apparatus as recited in claim 1 wherein said clocking gear includes a clock face provided with time indicia around a circumferential portion thereof, and at least one clocking tab engaged with said circumferential portion of said clock face and adapted to index said wheel gear by said predetermined radial angle.

10. An automatic fish feeding apparatus as recited in claim 1 further comprising alarm means responsive to said clock means and operative to sound an alarm whenever said wheel means is rotated by said predetermined radial angle.

11. An automatic fish feeding apparatus as recited in claim 10 wherein said alarm means is a bell which will ring as said wheel means is rotated.

12. An automatic fish feeding apparatus as recited in claim 1 further comprising a support structure for supporting said wheel means, said trip member, and said clock means.

13. An automatic fish feeding apparatus as recited in claim 12 further comprising a stand having a base engagable with a horizontal surface, and a post supported by said stand and adjustably coupled to said support structure.

14. An automatic fish feeding apparatus as recited in claim 12 further comprising means coupled to said support structure that is adapted to engage a portion of a fish tank.

* * * * *